March 5, 1957  S. J. SNOREK  2,783,840
DEVICE FOR SLOTTING TUBULAR PARTS
Filed April 8, 1952  2 Sheets-Sheet 2

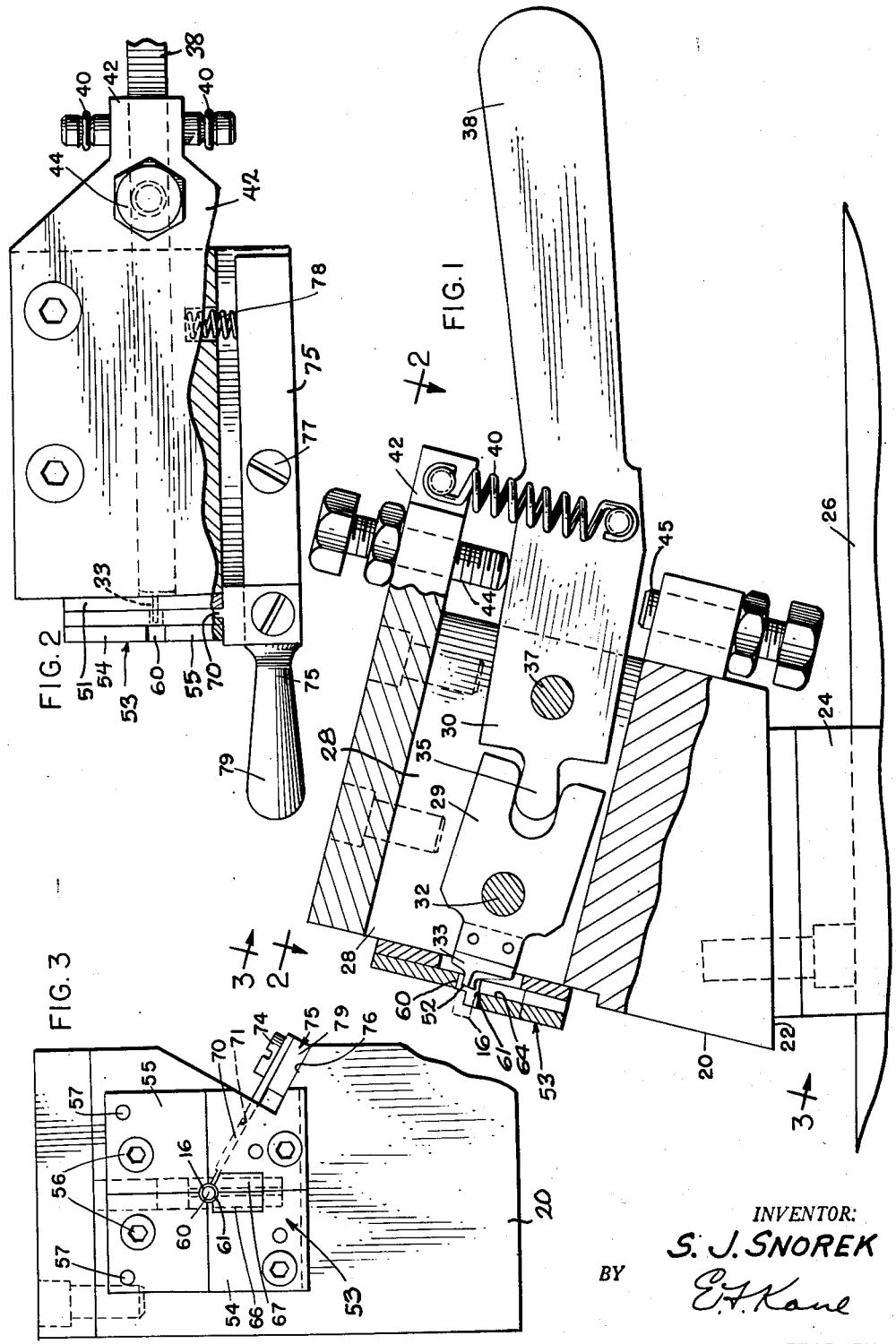

INVENTOR:
S. J. SNOREK
BY
*E. F. Kane*
ATTORNEY

United States Patent Office 2,783,840
Patented Mar. 5, 1957

2,783,840
DEVICE FOR SLOTTING TUBULAR PARTS

Stanley J. Snorek, Berwyn, Ill., assignor to Western Electric Company, Incorporated, New York, N. Y., a corporation of New York Application April 8, 1952, Serial No. 281,070

1 Claim. (Cl. 164—46)

This invention relates to a device for slotting tubular parts and more particularly to a device for indexing and shearing a plurality of slots in the walls of a hollow cylindrical article.

In tubular articles, as for example tubular terminal clips adapted to receive a round terminal therein, where it is necessary to form a plurality of slots therein it has been the practice to cut these slots diametrically across the part with a saw. Slots thus formed in a tubular member have burrs formed on the inner surface of some of the slots, the removal of which burrs necessitates a further operation.

It is an object of the present invention to provide a device for forming apertures or slots in tubuluar parts.

In accordance with one embodiment of the invention there is provided a die having a slot therein, a holder for supporting a tubular part to be slotted in engagement with the die and for rotation about its axis, a punch or shearing tool mounted for pivotal movement and having a portion thereof extending axially into the tubular part and conforming to and cooperating with the slotted portion of the die for shearing or punching a slot in the wall of the tubular part, and a lever for actuating the punch. A gage member is disposed at a predetermined angle relative to the punch and die so that after a slot has been punched therein the part may be rotated about its axis to the position where the gage member enters the slot which is thus located in a predetermined angular position to the punch and die, permitting successive slots to be formed in the tubular part in a predetermined spaced relation to each other.

Other objects and advantages of the invention will become apparent by reference to the following detailed description thereof and the accompanying drawings illustrating a preferred embodiment of the invention, in which Fig. 1 is a side elevational sectional view of the slotting device;

Fig. 2 is a fragmentary plan view of the device looking in the direction of the arrows 2—2 of Fig. 1;

Fig. 3 is an end elevational view of Fig. 1;

Figure 6:
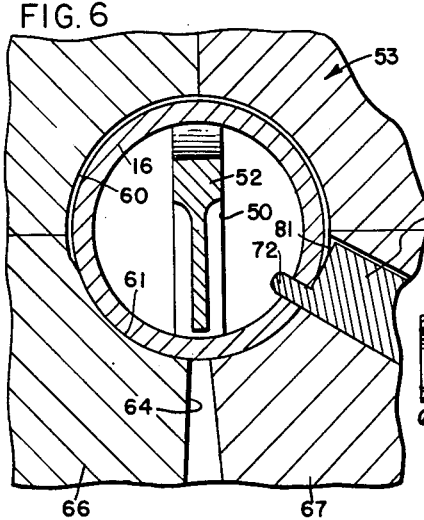
Fig. 6 is an enlarged vertical cross-sectional detailed view taken on the line 6—6 of Fig. 4.
Figure 4:
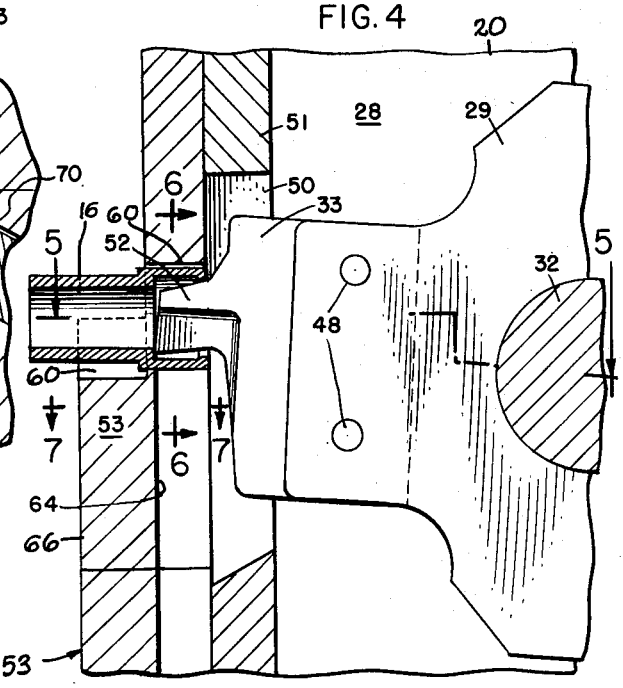
Fig. 4 is an enlarged vertical longitudinal sectional view of a portion of the device showing in dotted lines a tubular part positioned therein.
Figure 7:
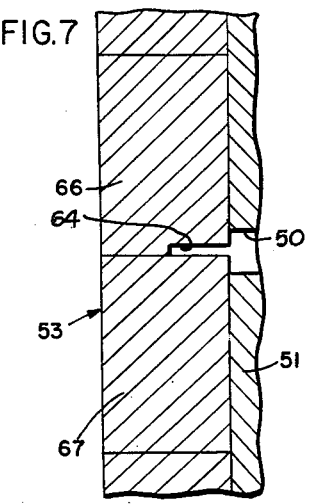
Fig. 7 is a detailed cross-sectional view taken on the line 7—7 of Fig. 4 showing the slotted die.
Figure 5:
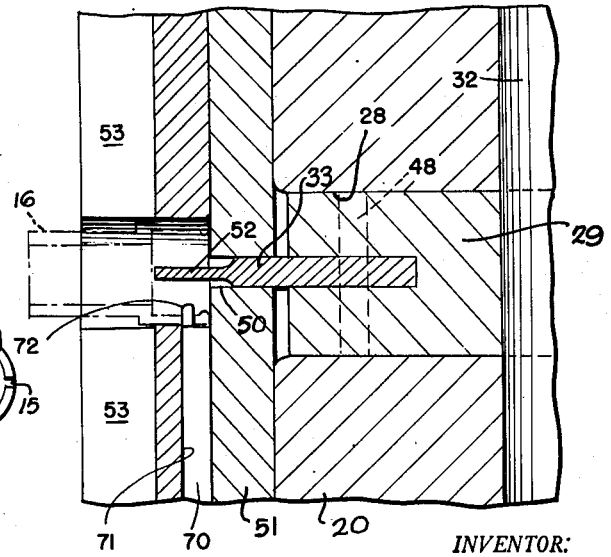
Fig. 5 is a horizontal sectional view taken on the lines 5—5 of Fig. 4.
Figures 8, 9:
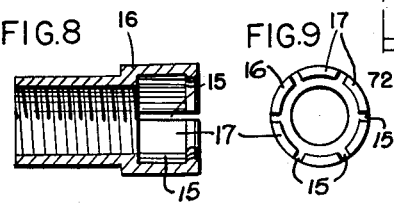
Figs. 8 and 9 are longitudinal sectional and end elevational views, respectively, of a slotted tubular part.
Figure 10:
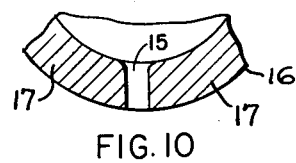
Fig. 10 is an enlarged detailed cross-sectional view through a slotted portion of the tubular part.

The present device is designed to form a plurality of slots 15 in tubuluar parts such as terminal clips 16 with the slots 15 in a predetermined angular relationship to each other to provide a plurality of spring fingers 17 of uniform width. The clip 16 is adapted to receive a connector element therein capable of being turned within the clip 16. It is desirable that the inner corners of the fingers 17 formed by the slots 15 be rounded and free of any burrs or sharp corners projecting inwardly of the tubular part.

The slotting device compises a substantially rectangular base member or block 20 having the lower face 22 thereof obliquely disposed relative to some of the adjacent surfaces thereof and to which surface 22 a bracket 24 is secured for mounting the device obliquely on a bench 26 as shown in Fig. 1. The block 20 has a vertical centrally disposed slot 28 in which is positioned a pair of levers 29 and 30. The arm 29 is pivotally mounted intermediate its ends for oscillation about a pin 32 and has a punch or shearing tool 33 secured to its forward or left end as viewed in Fig. 1. At its other end the arm 29 is slotted for receiving the reduced rounded end 35 of the lever 30 which is pivotally mounted for oscillating movement about a pin 37 and has a handle 38 by means of which the lever 30 may be oscillated to impart oscillation to the lever 29 and the tool 33 thereon. A pair of springs 40 attached at one end to the lever 30 and at their other ends to a plate 42 fastened to the top of the block 20 yieldably maintains the lever 30 in a normal position against an adjustable stop 44. A stop 45 carried by the block 20 serves to limit the movement of the lever 40 in the opposite direction.

The tool 33 is made from a plate of hardened metal and fits into a slot at the forward end of the arm 29 and is fastened thereto by rivets 48. A portion of the tool 33 fits into a vertically disposed slots 50 in a plate 51 which is secured to the front face of the block 20. The side walls of the slot 50 engage and guide the tool in a vertical direction and prevent lateral displacement thereof. At its forward end the tool 33 is reduced in size to form a projecting nose or element 52 adapted to fit into a tubular terminal 16 supported on the die 53. The lower end of the nose 52 of the tool 33 is reduced in width and has a sloping lower cutting edge conforming to the shape of the slot to be sheared in the wall of the tubular member 16.

The die 53 comprises a plate, which, for convenience of manufacture, is made in two sections, 54 and 55, which lie against the plate 51 and are secured with the plate 51 against the end of the block 20 by a plurality of cap screws 56 and dowels 57. For receiving the tubular terminal 16 the die 53 is provided with an aperture 60, the lower cylindrical portion 61 of which conforms to the peripheral surface of the tubular terminal 16 and forms a seat or holder for rotatably supporting the terminal 16 for rotation about its axis. The terminal 16 is supported on the seat 61 with its forward edge engaging the face of the plate 51. The die 53 is provided with a slot 64 which intersects the arcuate surface 61 to form cutting edges conforming to the shape of the slot 15 to be formed in the tubular terminal 16 and cooperating with the cutting edges of the tool 33 for cutting said slots 15. To withstand the wear and give long life to the die, hardened die inserts 66 and 67 are built into the die 54. It will be seen from the description thus far that a terminal clip 16 may be positioned on the seat or holder 61 of the die 54 and the handle 38 may be depressed, causing the oscillation of the levers 30 and 29 to cause the downward movement of the tool 33 and the shearing of a slot 15 in the lower wall of the terminals 16 and upon the release of the handle 38 the levers 29 and 30 and the tool 33 will be retracted to their normal positions.

Means are provided whereby the tubular terminal 16 may be indexed through a predetermined angular distance to form successive slots therein in a predetermined angular relation to each other. This indexing means comprises an elongated gage member or rod 70 mounted for sliding reciprocable movement in a slot 71 in the die 54 directed toward the axis of the holder 61 and disposed at a predetermined angle from the vertical plane passing through the tool 33 and the slot 64 of the die and through said axis. At its inner or upper end the gage member 70 has a shoulder 81 adapted to engage the terminal clip 16 and has a finger 72 which is adapted to fit into a slot 15 formed in the terminal 16 to prevent rotation or angular displacement of the terminal clip 16 and to position the slot in a predetermined position relative to the tool 33 and the slot 64 of the die. At its lower end the gage member 70 is enlarged and pivotally connected by a screw 74 to a lever 75 which is supported on a surface 76 of the block 20 for oscillatable movement about a pivot pin 77. A spring 78 bearing against one end of the lever 75 stresses the lever for rotation about its pivot to urge the gage member 70 upwardly into engagement with the terminal 16 to yieldably retain the terminal 16 in the holder and by means of a handle 79 on the lever 75, the lever may be oscillated in a reverse direction to retract the gage member 70 and the finger 72 from a slot in the terminal clip 16. As shown in Fig. 3 the gage member 70 is disposed at an angle of 60° relative to the vertical plane passing through the slot in the die, which arrangement permits the indexing of the tubular terminal clip 16 successively through 60° to permit the punching of 6 slots in the walls of the terminal.

In the operation of the device the lever 79 is oscillated to withdraw the finger 72 from the aperture 60 in the die 54 and the terminal is inserted in the aperture and seated on the seat 61 with the end of the terminal in engagement with the plate 51. The end 52 of the cutting tool 33 is disposed within the end of the tubular terminal 16 and the operator may then engage the handle 38 of the lever 30 and move it down against the stop 45 to actuate the lever 29 through a predetermined arc to cause the downward movement of the cutting tool, which in cooperation with the die 53, effects the cutting of a notch 15 in the terminal 16. The tool 33 is returned to normal position and the terminal 16 may then be rotated in a counter-clockwise direction as viewed in Figs. 3 and 6 until the slot 15 is in alignment with the gaging finger 72 on the gage bar 70 and the finger is advanced into the slot 15 to hold the terminal against rotation and position the slot in its proper angular position relative to the punch and die. After the tubular terminal 16 has been thus indexed the handle 38 is again depressed to effect the cutting of a second slot in the walls of the terminal 16 after which the lever 75 may be actuated to disengage the indexing finger 72 from the notch 15 to permit a slight turning of the tubular terminal 16. The lever 75 is then released to permit the finger 72 to yieldably engage the periphery of the terminal 16 after which the terminal is rotated in a counter-clockwise direction until the gage finger 72 engages in the second slot to properly index the terminal for the succeeding slot punching operation. The remainder of the slots are formed in the terminal in a similar manner.

The cutting action of the tool or punch 33 in forming the slots 15 in the walls of the terminal clips 16 is such that round corners are formed on the inner edges of the fingers or walls 17 of the clip. Thus, there are no inwardly projecting burrs which would necessitate a deburring operation, nor are there any sharp edges of the interior of the clip which would engage with portions of the terminals inserted therein to interfere with the free turning movement thereof.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

In a device for slotting tubular articles, a base having a backward slanting surface, a die having a shearing slot and a circular recess therein conforming to and for slidably receiving a tubular article by gravity, a stop and guide plate having a slot, means for mounting the plate and the die on the said slanting surface with the slanting axis of the said die recess in alignment with the said plate slot, so that the back of the die recess terminates with the outer face of the said plate against which the sliding tubular article stops, a punch movably mounted in the said plate slot and having a reduced shearing nose extending into the said die recess in alignment with the said die shearing slot, means pivoted on the base for operating the shearing nose of the punch inside of the die recess through the said die shearing slot to cut a slot of predetermined length in the tubular article, and a plurality of adjustable stops mounted on the base for restricting the movement of the punch operating means.

References Cited in the file of this patent
UNITED STATES PATENTS

| | | |
|---|---|---|
| 163,341 | Stephens | May 18, 1875 |
| 321,804 | Douglas | July 7, 1885 |
| 401,594 | Schofield | Apr. 16, 1889 |
| 457,405 | Smith | Aug. 11, 1891 |
| 675,235 | Newburg | May 28, 1901 |
| 737,230 | Hatton | Aug. 25, 1903 |
| 750,746 | Woodburn | Jan. 26, 1904 |
| 894,726 | Corbin | July 28, 1908 |
| 1,230,319 | Paulson et al. | June 19, 1917 |
| 1,588,200 | Skelton | June 8, 1926 |
| 2,204,273 | Hale | June 11, 1940 |
| 2,237,203 | Swanson | Apr. 1, 1941 |
| 2,297,013 | Nichols et al. | Sept. 29, 1942 |
| 2,363,630 | Wales | Nov. 28, 1944 |
| 2,554,928 | Segal | May 29, 1951 |
| 2,633,890 | Rozanek | Apr. 7, 1953 |